US008197628B2

(12) United States Patent
Resch et al.

(10) Patent No.: US 8,197,628 B2
(45) Date of Patent: Jun. 12, 2012

(54) METHOD FOR TEMPORARY PROTECTION OF BLANK SURFACES AGAINST CORROSION, AND COMPONENT WITH TEMPORARY CORROSION PROTECTION

(75) Inventors: Frank Resch, Meggen (CH); René Kunz, Tokyo (JP)

(73) Assignee: Inventio AG, Hergiswil NW (CH)

(*) Notice: Subject to any disclaimer, the term of this patent is extended or adjusted under 35 U.S.C. 154(b) by 694 days.

(21) Appl. No.: 11/360,637

(22) Filed: Feb. 23, 2006

(65) Prior Publication Data

US 2006/0199017 A1 Sep. 7, 2006

(30) Foreign Application Priority Data

Feb. 23, 2005 (EP) .................................... 05003818

(51) Int. Cl.
*B32B 15/00* (2006.01)

(52) U.S. Cl. ......................... 156/247; 427/154; 427/156

(58) Field of Classification Search ......................... None
See application file for complete search history.

(56) References Cited

U.S. PATENT DOCUMENTS 4,224,379 A 9/1980 Ichinose et al.
4,792,464 A 12/1988 Martenson
5,055,346 A * 10/1991 Rohrbacher .................. 428/216
5,126,005 A * 6/1992 Blake .............................. 216/47
5,464,692 A 11/1995 Huber
5,888,281 A * 3/1999 Longo ........................ 106/14.29
7,204,344 B2 * 4/2007 Korchagin et al. ............. 182/82
2002/0078856 A1 * 6/2002 Hahn et al. ................. 106/14.14
2004/0009354 A1 * 1/2004 Krepski et al. ............. 428/423.1
2008/0135345 A1 * 6/2008 Kocher et al. ................ 187/351
2008/0210495 A1 * 9/2008 Fargo ............................ 187/406

* cited by examiner

*Primary Examiner* — Philip Tucker
*Assistant Examiner* — Vicki Wu

(74) *Attorney, Agent, or Firm* — Fraser Clemens Martin & Miller LLC; William J. Clemens

(57) ABSTRACT

A method for temporary protection of blank surfaces of a component against corrosion includes a first step wherein a corrosion protection foil is applied to a blank surface to be protected and a second step wherein a self-sealing, semi-solid protection layer is applied in order to at least partly cover the corrosion protection foil. At a later time at least a part of the blank surface can be exposed by pulling off the corrosion protection foil inclusive of the protection layer disposed thereon. The self-sealing protection layer forms a closed film and the corrosion protection foil and/or the protection layer comprise hydrophobically acting components in order to prevent moisture from penetrating to the blank surface to be protected.

8 Claims, 3 Drawing Sheets

METHOD FOR TEMPORARY PROTECTION OF BLANK SURFACES AGAINST CORROSION, AND COMPONENT WITH TEMPORARY CORROSION PROTECTION

BACKGROUND OF THE INVENTION

The present invention relates to a method for temporary protection of blank surfaces against corrosion and to a component with a surface protected against corrosion.

Corrosion is a known problem. There are various approaches in order to prevent or reduce corrosion. In that connection, for example, the flow of electrons can be interrupted in that the chemical composition of the materials concerned is changed or in that the material to be protected against corrosion is separated from the electrolyte (for example, salty water). There are also, for example, methods which are based on the use of a protection layer or a protection coating, on the use of a medium which prevents formation of rust, or on the use of a surface passivation. Such protection layers are typically based on painting, organic layers, ceramic and anorganic layers, plastic coatings, platings with non-rusting metal, etc. Other layers, such as, for example, zinc, aluminium-based metal and magnesium-based metal are distinguished by the fact that they have a tendency to corrode more quickly than the surface to be protected (these layers are therefore also termed sacrificial layers). Means which prevent rust formation typically change the surface chemistry and form a kind of intermediate layer. The surface passivation mentioned in the introduction thereagainst is carried out typically by the application or production of an oxide layer.

The mentioned methods are essentially suitable for permanent protection.

However, the need also exists to protect blank metal surfaces only temporarily. Thus, for example, there are semi-finished products or finished products which have a blank metallic surface which has to be protected after production and until final use. As an example there may be mentioned drive shafts, tooth flanks of gearwheels, rails and the like. In that case it is important for a protection means to be able to be applied quickly and simply and able to be removed again later. The approaches mentioned in the introduction are, however, only conditionally suitable when the point is temporary protection of a blank metal surface.

Two different methods have proved themselves in practice, although these methods have disadvantages.

A blank surface is usually protected by a corrosion protection means which is applied to or sprayed onto the surface. In machine and vehicle construction and in machine plants there is used for this purpose, for example, a product which is sold under the name "Tectyl" (registered trademark of Daubert Chemical Company, Inc., Chicago, Ill.). This product is distinguished by a good corrosion protection, but has the disadvantage that it can be removed only with difficulty. Particularly in the case of elevator construction, where guide rails are used for the elevator car or the counterweight and the running surfaces of such rails must be absolutely smooth and clean, such a protection means, which is removable only with cost in order to be again free of residue, is only conditionally suitable.

The use of solvents in order to expose the blank surface again also has disadvantages, since these solvents can be environmentally harmful and therefore expensive in handling.

The sacrificial layers mentioned in the introduction are also not suitable for a temporary protection, since they have the disadvantage that they enter into an intimate connection with the surface to be protected and cannot be removed again or can be removed only with a substantial outlay on processing. Moreover, they change the properties of the blank surface and thus cannot be used with guide rails, drive shafts and the like.

SUMMARY OF THE INVENTION

The present invention thus has the object of providing an approach which makes it possible to protect blank surfaces, particularly blank metallic surfaces, in simple and effective manner against corrosion, wherein these surfaces shall after a period of time be exposed again free of residue.

A first method according to the present invention is distinguished by the fact that for protection of blank surfaces against corrosion use is made of a multi-layer protection system which is applied in the following steps and removed again when required. A corrosion protection foil is applied to a blank surface to be protected. This corrosion protection foil is at least partly covered by the application of a self-sealing, semi-solid protection layer. These two layers form the multi-layer protection system. The protection system is removed again when required. At least a part of the blank surface is exposed by pulling off at least a part of the corrosion protection foil. The protection layer is also removed at the same time with the corrosion protection foil.

According to the present invention the self-sealing protection layer forms a closed film and the protection system comprises hydrophobically acting components in order to prevent moisture from penetrating to the blank surface to be protected.

The method including application of the corrosion protection film only in that region of the blank surface that is to be temporarily covered which on exposure is to be laid open again, wherein the self-sealing protection layer covers not only the corrosion protection foil, but also adjacent regions, and on exposure the self-sealing protection layer remains on the adjacent regions is particularly advantageous for temporary protection of a guide rail of an elevator installation, since with this method only the running surfaces of the guide rails are selectively exposed.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

The present invention relates to a method for temporary protection of smooth surfaces having a tendency to corrode.

The inventive approach is described in the following on the basis of a method example, wherein subsequently further methods are explained with reference to the first method example.

Figure 1:
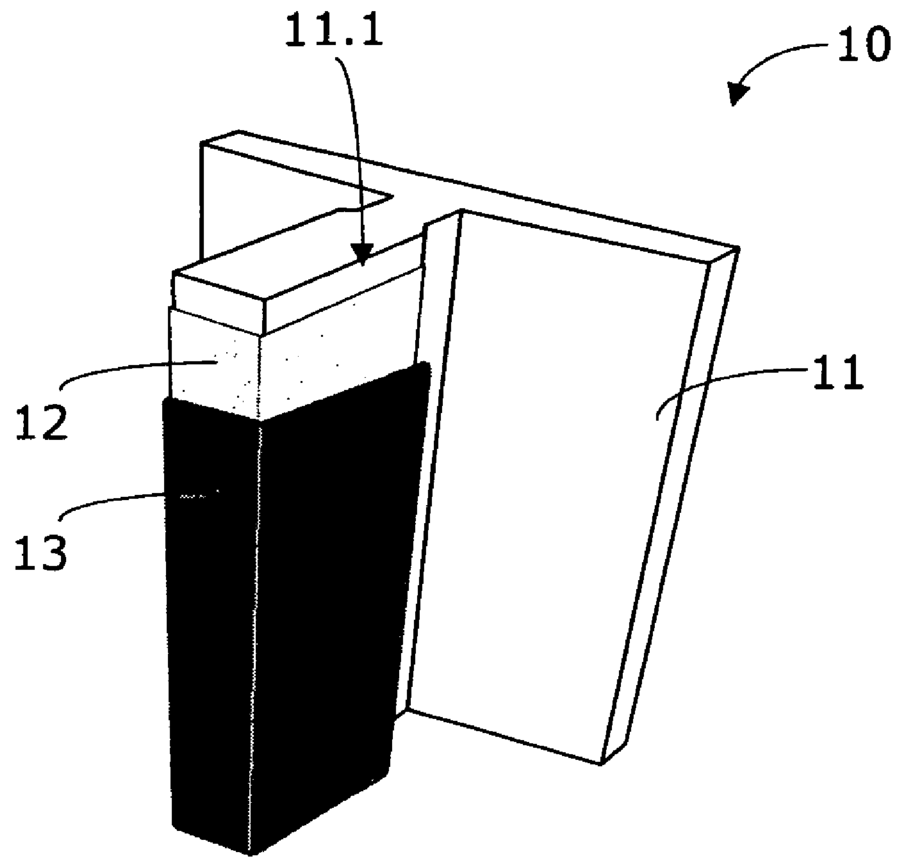
FIG. 1 is a schematic, perspective view of part of an elevator guide rail with a protection system according to the present invention.

In order to illustrate the invention reference is made to FIG. 1. There is concerned a method for temporary protection of blank surfaces 11.1 against corrosion. The following steps are carried out in order to provide a protective system which develops the desired protective effect.

After an optional cleaning step a corrosion protection foil 12 is applied to the blank surface 11.1 to be protected. In FIG. 1, the illustration was intentionally selected so that the corrosion protection film 12 is visible. In a further step a self-sealing, semi-solid protection layer 13 is applied. This protection layer 13 is applied so that it at least partly covers the corrosion protection foil 12, as can be seen in FIG. 1. The corrosion protection foil 12 forms, together with the protection layer 13, an intelligent protective system, the construction and effect of which is explained below.

After application of this protective system the component, for example a guide rail 10, is protected in the region of the smooth surface 11.1 against corrosion. The component can now be stored and transported as desired.

Figure 3A:
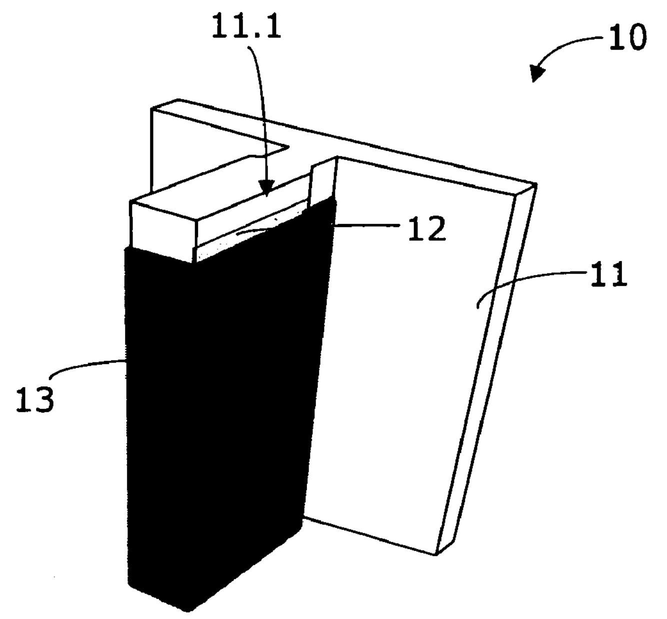
FIG. 3A is a schematic, perspective view of part of an elevator guide rail with a protection system according to the present invention, wherein the corrosion protection foil covers only the surface to be protected.

At a later point in time, for example after transport to a construction site and mounting on site, or during installation of the guide rail in the elevator installation, or prior to placing the elevator installation in operation, at least a part of the blank surface 11.1 can be exposed again by pulling off at least a part of the corrosion protection foil 12. The protection layer 13 can be removed in simple manner together with the corrosion protection foil 12. In the case of appropriate selection of the corrosion protection foil 12, neither a tool nor a special machine is required for that purpose. The corrosion protection foil 12 can be pulled off without effort and without residues. A further method according to the present invention is described in the following with reference also to FIGS. 3A and 3B. The illustrated example concerns a guide rail 10, as used in, for example, an elevator construction. The rail 10 has a T-shaped cross-section. The two mutually opposite side surfaces of the web of the rail 10 serve as guide for an elevator car or a counterweight. One of the two oppositely disposed side surfaces is denoted in FIG. 3A by 11.1. The other side surface of the web is not visible. In order to ensure faultless functioning of the elevator car it is important that the side surfaces are blank. This means that these running surfaces 11.1 should not have rust, residues of rust protection agents or mechanical damage. This is essential, above all, when emergency braking actions of the elevator car occur, since in this case there is direct action of braking means on the running surfaces 11.1.

In the illustrated example of embodiment the corrosion protection foil 12 is applied only to those regions of the blank surface 11.1 which are to be later exposed. It can be seen in FIG. 3A that the corrosion protection foil 12 is strip-shaped and extends over the entire surface 11.1 parallel to a longitudinal axis of the rail 10. The other surfaces of the rail 10 are not covered by the foil 12. The self-sealing protection layer 13 is now applied, wherein this protection layer 13 then covers not only the corrosion protection foil 12, but also adjacent regions of the rail 10. In the illustrated example the protection layer 13 covers all sides of the entire web of the T-shaped rail 10. The protection layer 13 reaches as far as the right-angled transition region between the web and the transverse plate of the T-girder.

Figure 3B:
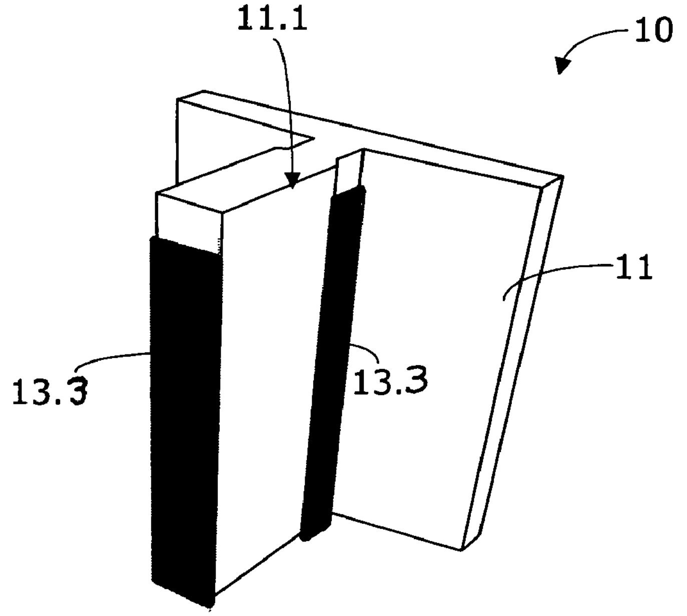
FIG. 3B is a view of the guide rail, which is shown in FIG. 3A, after the corrosion protection foil was removed and the surface to be protected thereby exposed.

In the case of exposure merely the strip-shaped corrosion protection foil 12 inclusive of a part of the protection layer 13 is now pulled off and the blank surface 11.1 thereby exposed, as shown in FIG. 3B. Portions 13.3 of the self-sealing protection layer portion 13 remain on the adjacent regions of the web, as can be recognized in FIG. 3B.

This approach makes it possible to protect a component entirely and in the case of need to expose a predetermined region. The form of the predetermined region is defined by the shape of the corrosion protection foil 12.

According to the present invention the protection layer 13 is distinguished by the fact that it is self-sealing and forms a closed film. Moreover, the corrosion protection foil 12 and/or the protection layer 13 comprise hydrophobically acting components in order to prevent moisture from penetrating to the blank surface 11.1 to be protected. Moreover, the hydrophobic provision has the consequence that water is displaced.

In a preferred form of embodiment the corrosion protection foil 12 is distinguished by the fact that it forms a strong adhesive bonding to blank surfaces, particularly blank metallic surfaces. On the one hand that leads to good adhesion of the corrosion protection foil 12 to the blank surface and on the other hand there thereby results a blocking effect between the blank surface 11.1 and the corrosion protection foil 12. This blocking effect can prevent penetration of moisture.

In a preferred form of embodiment the self-sealing (self-compensating) protection layer 13 is distinguished particularly by the fact that it forms a sealed, closed film. The protection layer 13 thereby forms a kind of closed membrane, which is preferably executed to be moisture-repellent. The film preferably has a thickness between ten microns and five hundred microns in order to be able to achieve the desired protective effect.

Figure 2A:
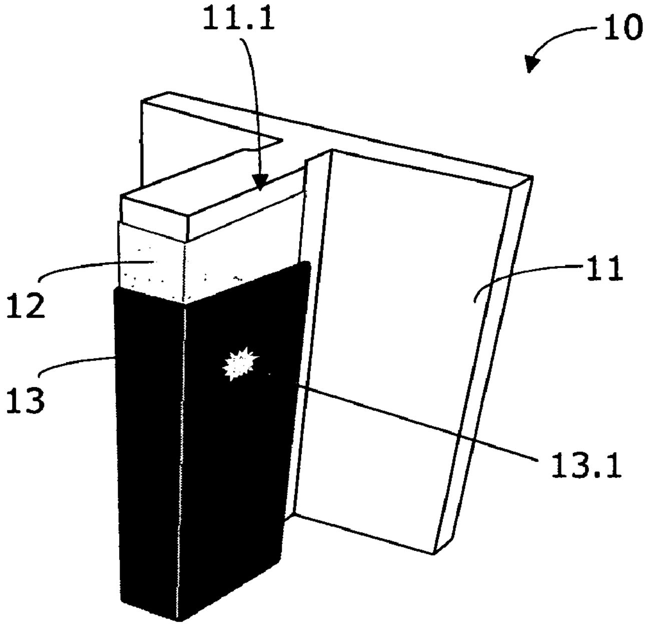
FIG. 2A is a view of the guide rail with protection system shown in FIG. 1 wherein mechanical damage has occurred.
Figure 2B:
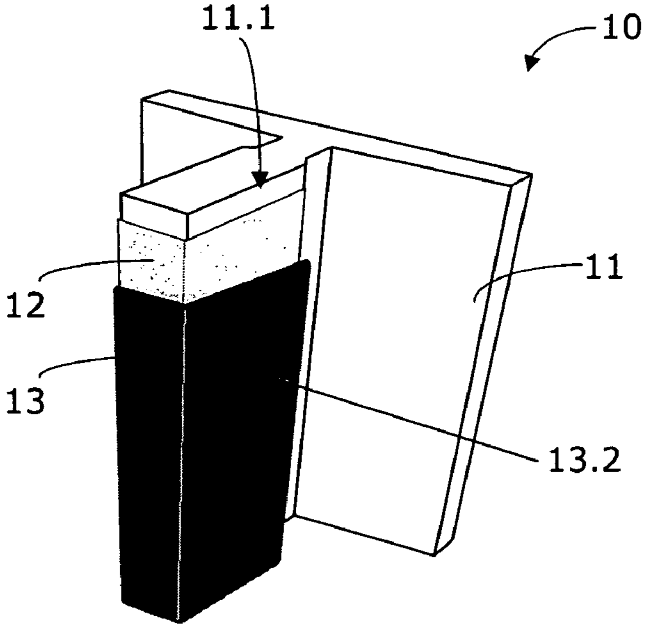
FIG. 2B is a view of the guide rail, which is shown in FIG. 2A, after the mechanical damage has healed.

The self-sealing protection layer 13 preferably comprises a thixotropic agent in order to thereby form, on application, on the one hand the sealed, closed film and on the other hand to offer protection against damage, in that the film automatically closes after a local mechanical disturbance 13.1, as indicated in FIG. 2A. A snapshot after occurrence of a local mechanical disturbance 13.1 is shown in FIG. 2A. The disturbance can be produced, for example, by contact with a tool or the like during transport of the component 10. The same component 10 is shown in FIG. 2B a short time later. Due to the self-sealing action of the protection layer 13 the location of the disturbance 13.1 has automatically closed. This location is denoted in FIG. 2B by 13.2. Closure of the disturbance 13.1 can take place, for example, in that the protection layer 13 continues to flow slowly and again closes the open location. Further details with respect to the self-sealing action and the thixotropic agent used in this connection are given in the following.

In general, there is denoted by the term "thixotropic" a reversible transition from a gel-state or gelatinous state to a solid state. This transition is reversible. Thus, in the case of a thixotropic material the viscosity reduces if, for example, shearing forces are applied.

By the term "thixotropic" there is understood in the following connection the setting of the protection layer 13 in a plastic state with the addition of thickeners, also termed thixotropic agent. In this state the otherwise very liquid protection layer 13 can be set to be so viscous that this can also be processed free of problems at vertical components 10 and does not run off. The thixotropically set protection layer 13 has the property that in rest it behaves like a gel and if it is agitated or processed, it acts like a viscous liquid. If a local disturbance occurs, as indicated in FIG. 2*a*, then due to the thixotropic agent the viscosity reduces in the region of the disturbance 13.1 and the protection layer 13 compensates for the disturbance, as shown in FIG. 2B at 13.2.

The self-sealing protection layer 13 is particularly preferred which combines one or more of the following functions in one substance or composition:

moisture repelling,
abrasion resistance,
low viscosity on application,
rapid hardening or drying,
resistant to touch.

The present invention is based, in a special form of embodiment, on passivation of the surface 11.1 to be protected. Inhibition of corrosion thereby results. The protection foil 12 and/or the protection layer 13 comprise a carrier material or carrier component and one or more pH buffer constituents (buffer agents). These buffer constituents are so selected that they keep the (metal) surface 11.1, which is to be protected, in the region of a pH value at which the surface is passive relative to corrosion. In order to protect the metal surface 11.1 the pH value according to the present invention is set to a range between 8 and 13 pH. The protection system of the protection foil 12 and the protection layer 13 is basically set by addition of the buffer constituents.

Particularly preferred are the protection foils 12 and/or the protection layers 13 having corrosion-inhibiting components which are suitable for the purpose of inhibiting corrosion of the surface 11.1 in the presence of moisture or in the presence of other corrosion-promoting substances.

In the case of a particularly preferred form of embodiment the corrosion-inhibiting components co-operate with the buffer constituents.

Particularly preferred are the protection foils 12 and/or the protection layers 13 which have water-repelling (hydrophobic) components in order to prevent water from coming into connection with the surface 11.1. Aluminium silicate and/or wax and/or oil can, for example, be used as hydrophobically acting components. Synthetic oils and/or refined microcrystalline waxes are particularly suitable.

It is also possible to add to the protection foil 12 and/or the protection layer 13 components in order to offer effective protection against corrosive materials such as air, carbon dioxide, chloric ions, etc.

The protective system, according to the present invention, of the protection foil 12 and the protection layer 13 comprises one or more of the above components.

The protection foil 12 comprises a flexible carrier material which is suitable for reception of the buffers and/or other components. Particularly suitable as such foils are: polymer material, polyacryl, silicon, polyurethane, vinyl polymer or polyvinylacetate, in order to mention to a few examples.

The protection layer 13 thereagainst comprises a special carrier component in order to give the protection layer 13 a film-like or gel-like consistency. Preferably there is concerned a wax-like carrier component and forms, after hardening, a flexible, sealed wax film. After coating or spraying the thixotropic property of the protection layer 13 comes into use and opposes entry of moisture and/or liquid, as described.

The components are preferably dispersed or absorbed in the carrier material (in the case of the protection foil 12) or carrier component (in the case of the protection layer 13).

According to the present invention there is made available an intelligent corrosion protection system which by contrast to the state of the art on the one hand offers good protection and on the other hand is removable again without problems and without cost. The surfaces 11.1 to be protected are not only passivated if buffer constituents find use, or protected against penetration of moisture if hydrophobically acting components are used, or reduce or prevent corrosion if corrosion-inhibiting components are used, but an effective overall protection is provided which combines positive characteristics of several protective mechanisms with one another in a previously unknown mode and manner.

It is an advantage of the present invention that the entire protection system is based on materials which are compatible with the environment. Moreover, the application and removal can be carried out in such a manner that chemicals do not have to be used. There is also no increased expenditure of energy required, since no hot air systems or grinding machines are needed.

The intelligent property of the protective system according to the present invention is realized by the combination of the two protection means 12, 13. In that case the protection foil 12 acts inter alia as a water-repellent (hydrophobic) and/or watertight blocking layer or blocking intermediate layer. If the protection layer 13 and the protection foil 12 should be damaged, then the components present in the protection layer 13 and/or the protection foil 12 come into use.

The use of the method according to the present invention is not restricted only to elevator guide rails. The method can be used generally on surfaces of components which have to be provided with a corrosion protection only temporarily, for example:

surfaces of guides, particularly guides of machine tools,
surfaces of drive shafts,
surfaces of drive pulleys,
surfaces of measuring tables, especially precision measuring tables.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for protection of running surfaces of an elevator guide rail against corrosion, comprising the steps of:

applying a moisture impermeable, corrosion protection foil to a running surface of the elevator guide rail to be protected, the corrosion protection foil exhibiting adhesive bonding with the running surface, whereby a blocking effect between the running surface and the corrosion protection foil results; and applying a self-sealing, semi-solid protection layer which at least partly covers the corrosion protection foil, wherein the protection layer forms a closed film and at least one of the corrosion protection foil and the protection layer include hydrophobically acting components that at least one of prevent moisture from penetrating to the running surface of the elevator guide rail to be protected and displace moisture which is present, wherein the protection layer includes a thixotropic agent in an amount sufficient to set the protection layer in a plastic state, and cause the protection layer to behave as a viscous liquid when agitated or processed, the thixotropic agent thereby protecting against damage by causing the protection layer to automatically close after a local mechanical disturbance of the protection layer, wherein at least one of the corrosion protection foil and the semi-solid protection layer includes one or more pH buffer agents that keep the blank surface at a pH value set in a range of between 8 and 13 at which the blank surface is passive relative to corrosion.

2. A method for protection of running surfaces of an elevator guide rail against corrosion, comprising the steps of:

providing the elevator guide rail with a transverse plate and a web, the web having two mutually opposite sides surfaces which serve as the running surfaces of the elevator guide rail;

applying a moisture impermeable, corrosion protection foil to each of the side surfaces of the web of the elevator guide rail to be protected, wherein other surfaces of the guide rail are not covered by the foils, the corrosion protection foils exhibiting adhesive bonding with the side surfaces of the web, whereby a blocking effect between the side surfaces of the web and the corrosion protection foils results; and applying a self-sealing, semi-solid protection layer to the guide rail, a first portion of the protection layer covering the corrosion protection foils and a second portion of the protection layer covering the other surfaces of the guide rail adjacent the corrosion protection foils, wherein the protection layer forms a closed film and at least one of the corrosion protection foils and the protection layer include hydrophobically acting components that at least one of prevent moisture from penetrating to the side surfaces of the web of the elevator guide rail to be protected and displace moisture which is present, wherein the protection layer includes a thixotropic agent in an amount sufficient to set the protection layer in a plastic state, and cause the protection layer to behave as a viscous liquid when agitated or processed, the thixotropic agent thereby protecting against damage by causing the protection layer to automatically close after a local mechanical disturbance of the protection layer, wherein the elevator guide rail is at least one of storable and transportable and the side surfaces of the web of the guide rail are protected against corrosive materials including moisture, and the corrosion protection foils and the first portion of the protection layer which covers the corrosion protection foils are removable after the at least one of storage and transport of the elevator guide rail to expose the side surfaces of the web, the exposed side surfaces being free of residue, wherein the second portion of the protection layer which covers the other surfaces of the guide rail adjacent the corrosion protection foil remains on the guide rail after the corrosion protection foil and the first portion of the protection layer has been removed.

3. The method according to claim 2 wherein the corrosion protection foils are strip-shaped and oriented parallel to a longitudinal axis of the guide rail.

4. The method according to claim 3 wherein the guide rail has a T-shaped cross-section and the other surfaces of the guide rail adjacent the corrosion protection foil include a front surface of the web and transition surfaces between the web and the transverse plate, the second portion of the protection layer remaining on the front surface and the transition surfaces of the web after the corrosion protection foil and the first portion of the protection layer have been removed.

5. The method according to claim 1 wherein the elevator guide rail is at least one of storable and transportable and is protected against corrosive materials including moisture, the corrosion protection foil and the protection layer which covers the corrosion protection foil being removable after the at least one of storage and transport of the elevator guide rail to expose the running surface, the exposed running surface being free of residue.

6. The method according to claim 1 further comprising the steps of:

at least one of storing and transporting the elevator guide rail and protecting the elevator guide rail against corrosive materials including moisture; and removing the corrosion protection foil and the protection layer which covers the corrosion protection foil after the at least one of storage and transport of the elevator guide rail to expose the running surface, the exposed running surface being free of residue.

7. The method according to claim 2 further comprising the steps of:

at least one of storing and transporting the elevator guide rail and protecting the side surfaces of the web of the guide rail against corrosive materials including moisture; and removing the corrosion protection foils and the first portion of the protection layer which covers the corrosion protection foils after the at least one of storage and transport of the elevator guide rail to expose the side surfaces of the web, the exposed side surfaces being free of residue, wherein the second portion of the protection layer which covers the other surfaces of the guide rail adjacent the corrosion protection foil remains on the guide rail after the corrosion protection foil and the first portion of the protection layer has been removed.

8. A method for protection of running surfaces of an elevator guide rail against corrosion, comprising the steps of:

applying a moisture impermeable, corrosion protection foil to a running surface of the elevator guide rail to be protected, the corrosion protection foil exhibiting adhesive bonding with the running surface, whereby a blocking effect between the running surface and the corrosion protection foil results;

applying a self-sealing, semi-solid protection layer which at least partly covers the corrosion protection foil, wherein the protection layer forms a closed film and at least one of the corrosion protection foil and the protection layer include hydrophobically acting components that at least one of prevent moisture from penetrating to the running surface of the elevator guide rail to be protected and displace moisture which is present, wherein the protection layer includes a thixotropic agent in an amount sufficient to set the protection layer in a plastic state, and cause the protection layer to behave as a viscous liquid when agitated or processed, the thixotropic agent thereby protecting against damage by causing the protection layer to automatically close after a local mechanical disturbance of the protection layer, wherein at least one of the corrosion protection foil and the semi-solid protection layer includes one or more pH buffer agents that keep the blank surface at a pH value set in a range of between 8 and 13 at which the blank surface is passive relative to corrosion;

at least one of storing and transporting the elevator guide rail and protecting the elevator guide rail against corrosive materials including moisture; and removing the corrosion protection foil and the protection layer which covers the corrosion protection foil after the at least one of storage and transport of the elevator guide rail to expose the running surface, the exposed running surface being free of residue.

* * * * *